(12) United States Patent
Jourdes

(10) Patent No.: US 8,047,173 B2
(45) Date of Patent: Nov. 1, 2011

(54) METHOD FOR CONTROLLING A STOP AND AUTOMATIC RESTART DEVICE FOR A THERMAL ENGINE

(75) Inventor: Philippe Jourdes, Ermont (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 368 days.

(21) Appl. No.: 12/515,077

(22) PCT Filed: Oct. 30, 2007

(86) PCT No.: PCT/FR2007/052278
§ 371 (c)(1),
(2), (4) Date: May 15, 2009

(87) PCT Pub. No.: WO2008/059152
PCT Pub. Date: May 22, 2008

(65) Prior Publication Data
US 2010/0057323 A1    Mar. 4, 2010

(30) Foreign Application Priority Data
Nov. 15, 2006   (FR) ...................... 06 54903

(51) Int. Cl.
*F02D 29/06*   (2006.01)
*F02N 17/00*   (2006.01)

(52) U.S. Cl. ................ 123/179.4; 701/113; 290/40 C
(58) Field of Classification Search ............. 123/179.4; 701/112, 113, 114; 290/16, 17, 40 C
See application file for complete search history.

(56) References Cited

U.S. PATENT DOCUMENTS

| 6,335,574 | B1 |  | 1/2002 | Ochiai et al. |
| 6,418,899 | B1 | * | 7/2002 | Bluemel et al. ............ 123/179.3 |
| 6,624,528 | B2 | * | 9/2003 | Shimizu et al. ............ 290/40 C |
| 6,809,428 | B1 | * | 10/2004 | Blackburn et al. .......... 290/37 R |
| 7,107,956 | B2 | * | 9/2006 | McGee et al. ............ 123/179.3 |
| 7,216,618 | B2 | * | 5/2007 | Iwatsuki et al. ............ 123/179.4 |

(Continued)

FOREIGN PATENT DOCUMENTS

DE    102005003979 B3    3/2006

(Continued)

OTHER PUBLICATIONS

International Search Report of PCT/FR207/052278 mailed Apr. 28, 2008.

*Primary Examiner* — Thomas Moulis
(74) *Attorney, Agent, or Firm* — Nicolas E. Seckel

(57) ABSTRACT

The invention relates to a method for controlling a stop and automatic restart device for a thermal engine of a vehicle, comprising electric energy storage means and a reversible alternator connected to the thermal engine. The method comprises: comparing (16, 18) the temperature of the alternator (10) with a first predetermined temperature detecting (16, 18) the occurrence of at least one of the two following conditions concerning the electric energy storage means: a temperature (12) lower than a second predetermined temperature and a charge level (14) lower than a predetermined threshold; and if the alternator temperature is higher than the first predetermined temperature and if at least one of said two conditions occurs, inhibiting (26) the automatic restart of the engine.

20 Claims, 1 Drawing Sheet

U.S. PATENT DOCUMENTS

Figure 1:
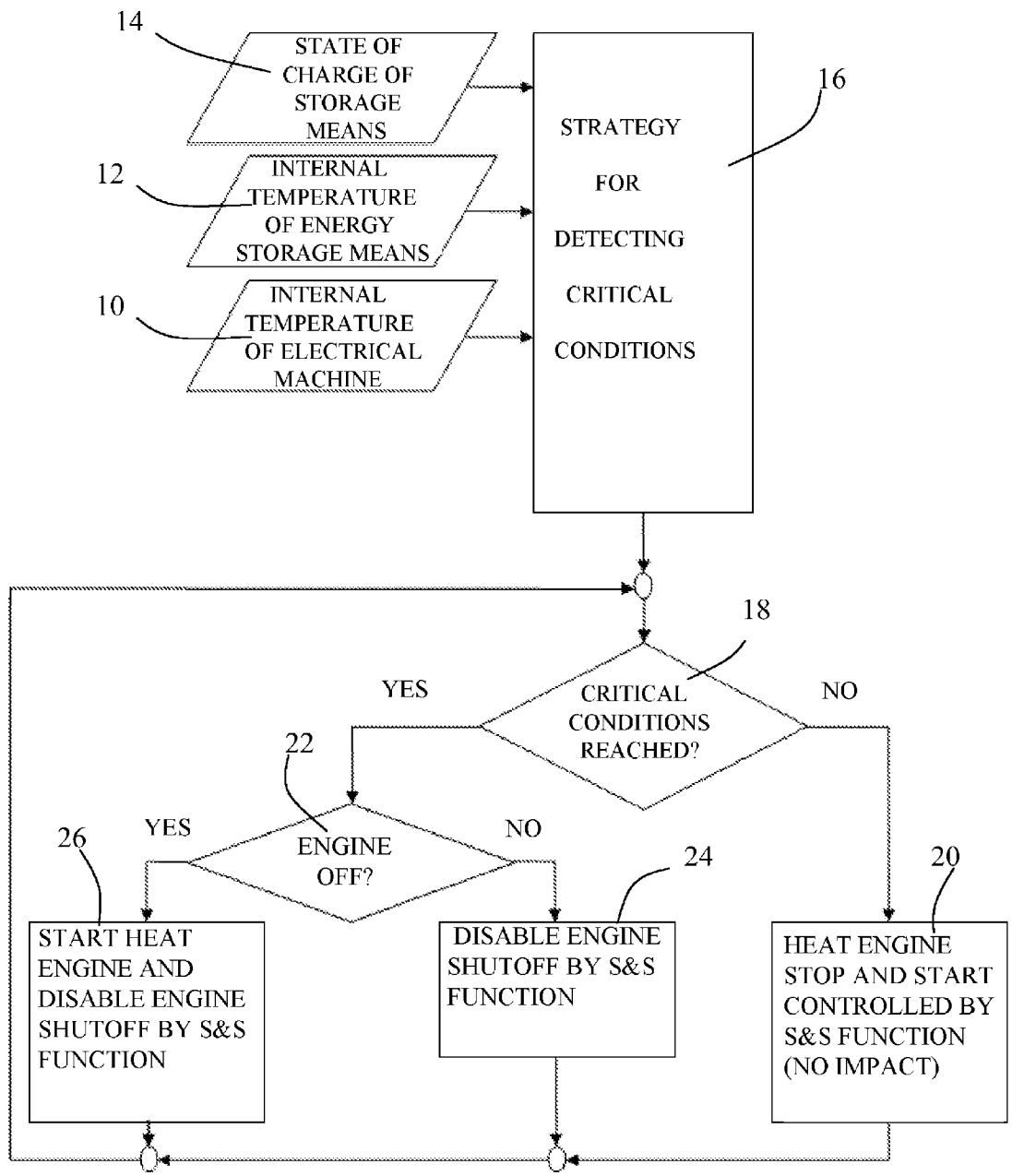

| | | | |
|---|---|---|---|
| 7,340,330 B2 * | 3/2008 | Okoshi et al. | 701/22 |
| 2003/0183191 A1 * | 10/2003 | Bertness et al. | 123/198 R |
| 2005/0188939 A1 * | 9/2005 | Iwatsuki et al. | 123/179.4 |
| 2006/0116797 A1 * | 6/2006 | Moran | 701/22 |
| 2006/0150937 A1 | 7/2006 | Lupo et al. | |
| 2008/0007205 A1 | 1/2008 | Thimm et al. | |

FOREIGN PATENT DOCUMENTS

| | | |
|---|---|---|
| EP | 1489295 A | 12/2004 |
| EP | 1674720 A | 6/2006 |

* cited by examiner

METHOD FOR CONTROLLING A STOP AND AUTOMATIC RESTART DEVICE FOR A THERMAL ENGINE

The present invention claims priority from French application 0654903, filed Nov. 15, 2006, the contents of which (description, claims, and drawings) are incorporated herein by reference.

The present invention relates to a control method for an automatic stop-and-start device for the heat engine of a vehicle, in particular a motor vehicle.

In order to reduce combustion engine fuel consumption and pollution, some vehicles are equipped with a stop-and-start device for the heat engine (hereinafter "S&S device" and designated as "Stop & Start" in English). Engine shutoff is automatically initiated each time the speed of the vehicle is almost zero, and the engine restarts automatically in response to a need communicated by the driver (e.g., pressing on the accelerator pedal or releasing the brake pedal) or in response to a need of the vehicle (e.g., maintaining the temperature of certain elements, keeping the heat on in the passenger compartment in winter or the air-conditioning in summer, or maintaining the temperature, and thus the effectiveness, of the catalyzer).

The S&S device has a logic circuit connected to sensors that monitor the appearance of certain conditions, and if one or more of these conditions appear, the S&S device either shuts the engine off (by interrupting the injection of fuel, for example) or restarts the engine when it is off. The engine is restarted with an electrotechnical system comprising electrical energy storage means connected to a reversible alternator, which is in turn connected to the engine crankshaft through a system of transmission pulleys and belts. The electrical energy storage means can be made up of one or more batteries or a super capacitor. The storage means and the various electrical appliances of the vehicle are powered by the alternator when the latter is being driven by the heat engine (mechanical energy converted into electrical energy). When the alternator is operating as an electric motor powered by the storage means, it actuates the rotation of the crankshaft (electrical energy converted to mechanical energy). In this way, the heat engine can be turned on by the alternator.

Patent application FR 2816891 filed by the applicant describes an automatic stop-and-start control system for a vehicle heat engine. A computer containing an engine control algorithm acts according to the following parameters: vehicle speed, gear ratio engaged, clutch position, engine speed, engine temperature, vehicle inclination, door contact switch, and alternator blocked. Although the device described in this patent application operates correctly, it has the disadvantage that it does not take into account the elements of the electrotechnical system.

In extreme or critical conditions, the performance of the alternator or of the storage means may not be adequate to enable the heat engine to restart. These elements are therefore oversized so as to be able to restart the engine in practically any conditions, which incurs an additional cost for these elements and takes more space. However, these critical conditions only occur in about 10% of the total vehicle driving time.

The present invention consists in detecting these critical conditions and disabling the S&S function when these conditions occur. This way, we can dispense with oversizing the alternator and the electrical energy storage means, and thus save on costs, weight, and space taken by these elements.

More precisely, the invention relates to a control method for an automatic stop-and-start device for a heat engine of a vehicle comprising electrical energy storage means and a reversible alternator connected to the heat engine. According to the invention, the method consists in:

- comparing the alternator temperature to a first predetermined temperature,
- detecting the appearance of at least one of the following two conditions relative to the electrical energy storage means: a temperature less than a second predetermined temperature and a charge level less than a predetermined threshold, and
- disabling the automatic engine restart if the alternator temperature is greater than the first predetermined temperature, and if at least one of the said conditions appears.

Advantageously, the alternator temperature is that of its stator.

Preferably:
- the first predetermined temperature is between 110° C. and 150° C., preferably around 130° C.;
- the predetermined threshold for the charge level is less than 90% and preferably around 80% of the maximum charge level;
- the second predetermined temperature is between −15° C. and +5° C., preferably around −10° C.

According to a preferred embodiment of the invention, the said two conditions are taken into account for disabling or not disabling the automatic engine restart.

Advantageously, in addition to disabling the engine restart, the automatic engine shutoff is disabled if the alternator temperature is greater than the first predetermined temperature and if at least one of the said two conditions relating to the storage means appears.

Other advantages and characteristics of the invention will appear in the following description of an embodiment of the invention, given as a non-limiting example, with reference to the attached drawing and in which FIG. 1 is a diagram illustrating the method according to the invention.

The automatic stop-and-start device for a heat engine controlled or managed according to the invention comprises sensors, a logic circuit, a reversible alternator (able to operate as a current generator or as an electric motor) and electrical energy storage means. The latter can be made up of one or more batteries or a "super capacitor" (high capacity condenser), charged by the alternator when the latter is operating as a current generator. The sensors are temperature probes, one dedicated to the stator temperature and the other to the storage means (preferably the internal temperature of the storage means), as well as a voltmeter meter and/or ammeter that monitors the charge level of the storage means. These sensors are connected to the logic circuit, which contains a control algorithm for the device in a memory, this algorithm including the steps of the method of the invention. The alternator temperature can also be monitored by the rotor temperature. To do this, since the rotor is powered by direct current, we measure the amperage flowing in the rotor. The temperature of the rotor is determined from the amperage.

The various steps of the method shown in FIG. 1 (except temperature and charge level detection, steps 10, 12 and 14 of the method) are implemented using a logic circuit, preferably a microprocessor. Step 10 of the method consists in detecting the internal temperature of the alternator, step 12 in detecting the internal temperature of the storage means, and step 14 in detecting the state of charge of the electrical energy storage means.

Step 16 consists in comparing:

the alternator temperature to a first predetermined temperature, and if the alternator temperature is greater than first temperature, a first critical condition is satisfied;

the storage means temperature to a second predetermined temperature, and if the temperature of the storage means is less than the second temperature, a second critical condition is satisfied;

the charge level of the storage means to a predetermined threshold, and if the charge level is less than this threshold, a third critical condition is satisfied. The predetermined threshold is expressed as a percentage of the maximum charge value, which corresponds to the fully charged electrical energy storage means.

It should be noted that in the temperature domains commonly found in an operating alternator and in electrical energy storage means, the efficiency of the alternator decreases as the temperature increases, whereas the efficiency of the electrical energy storage means decreases as the temperature decreases (e.g., the efficiency of a battery decreases sharply in negative temperatures).

In step 18, we determine whether at least one of the critical conditions has been met. If this is not the case, the heat engine's automatic stop-and-start S&S function is not disabled (step 20). If this is the case, we determine in step 22 whether the engine is off. If the engine is not off, we prevent the S&S function from turning off the engine (step 24). If the engine is off, we prevent the S&S function from turning off the engine, and restart the heat engine using the traditional starter (step 26).

The method is in use continuously while the vehicle is running. After each of the steps 20, 24 and 26, we return to step 18 to determine once again whether at least one of the critical conditions has been reached.

The values of the first and second temperatures, as well as the charge threshold of the storage means, are dependent on the heat engine's characteristics. For example, a diesel engine requires more torque in order to start. With electrical energy storage means of equal capacity, the critical level for the charge threshold for a diesel engine will be preset at a higher value than for a gasoline engine. However, we can name the following values: the first critical temperature (of the alternator) can be between 110° C. and 150° C., preferably around 130° C.; the second critical temperature (of the storage means) can be between −15° C. and +5° C., preferably around −10° C., and the charge threshold level for the storage means can be less than or equal to 90%, preferably around 80%.

The way the various parameters combine with one another is important in determining the critical values. For example, if the threshold of one of the parameters reaches a value that is within the range of critical values cited above (e.g., 110° C. to 150° C. for the alternator temperature), the critical value for this parameter can be chosen at a high value in the domain (e.g., 140° C.). Conversely, if two or three parameters reach values located within the various domains of critical values, stricter critical values can be preset (e.g., 0° C. for the critical temperature of the storage means and 120° C. for the critical temperature of the alternator). On average, for example, we can take the value 130° C. for the first temperature (critical temperature of the alternator), −10° C. for the second temperature (temperature of the energy storage means), and a charge level threshold of 80% for the storage means.

According to a simplified mode of implementing the method, we can take into account only the alternator temperature (step 10) and just one of the two steps 12 and 14 relating to the electrical energy storage means, which are temperature and charge level, respectively. Providing just for the restarting of the engine is also an option, for engines equipped with a traditional starter. In this case, if the S&S function stops the engine despite the fact that one of the critical conditions has been reached, the engine can be restarted using the starter and not the alternator.

The invention makes it possible to optimize the size of the alternator and of the electrical energy storage means by sizing these elements for nominal operating conditions rather than addressing all operating conditions (particularly extreme conditions, such as −20° C. for a battery). This way, the cost of these elements is optimized according to the desired performance of the S&S device. Restarting is made more robust with the S&S function by controlling critical conditions. The invention also makes it possible to reduce the power of the reversible alternator in start mode and thereby reduce the amperage it uses. This helps to stabilize the electric voltage on the terminals of the various electrical appliances of the vehicle, which makes it possible to reduce the size of the system responsible for keeping electric voltage substantially constant on the terminals of these electrical appliances.

Embodiments other than those described and shown may be envisioned by the person skilled in the art without departing from the scope of the present invention.

The invention claimed is:

1. Control method for an automatic stop-and-start device for a heat engine of a vehicle comprising electrical energy storage means and a reversible alternator connected to the heat engine, comprising:

comparing the alternator temperature to a first predetermined temperature, detecting the appearance of at least one of the following two conditions relative to the electrical energy storage means: a temperature less than a second predetermined temperature and a charge level less than a predetermined threshold, and disabling the automatic engine restart if the alternator temperature is greater than the first predetermined temperature, and if at least one of said two conditions appears.

2. Method according to claim 1, wherein the temperature of the alternator is that of its stator.

3. Method according to claim 1, wherein the first predetermined temperature is between 110° C. and 150° C., and the predetermined threshold for the charge level is less than 90% of the maximum charge level.

4. Method according to claim 3, wherein the first predetermined temperature is around 130° C. and the predetermined threshold for the charge level is around 80% of the maximum charge level.

5. Method according to claim 1, wherein the second predetermined temperature is between −15° C. and +5° C.

6. Method according to claim 5, wherein the second predetermined temperature is around −10° C.

7. Method according to claim 1, wherein said two conditions are taken into account for disabling or not disabling the automatic engine restart.

8. Method according to claim 1, wherein, in addition to disabling the engine restart, the automatic engine shutoff is disabled if the alternator temperature is greater than the first predetermined temperature and if at least one of the said two conditions relating to the storage means appears.

9. Method according to claim 2, wherein the first predetermined temperature is between 110° C. and 150° C., and the predetermined threshold for the charge level is less than 90% of the maximum charge level.

10. Method according to claim 9, wherein the first predetermined temperature is around 130° C. and the predetermined threshold for the charge level is around 80% of the maximum charge level.

11. Method according to claim 2, wherein the second predetermined temperature is between −15° C. and +5° C.

12. Method according to claim 11, wherein the second predetermined temperature is around −10° C.

13. Method according to claim 3, wherein the second predetermined temperature is between −15° C. and +5° C.

14. Method according to claim 13, wherein the second predetermined temperature is around −10° C.

15. Method according to claim 4, wherein the second predetermined temperature is between −15° C. and +5° C.

16. Method according to claim 15, wherein the second predetermined temperature is around −10° C.

17. Method according to claim 9, wherein the second predetermined temperature is between −15° C. and +5° C.

18. Method according to claim 17, wherein the second predetermined temperature is around −10° C.

19. Method according to claim 10, wherein the second predetermined temperature is between −15° C. and +5° C.

20. Method according to claim 19, wherein the second predetermined temperature is around −10° C.

\* \* \* \* \*